F. A. RIDER.
APPARATUS FOR MAKING CLEAR ICE IN CANS.
APPLICATION FILED FEB. 24, 1909.
935,928.
Patented Oct. 5, 1909.
2 SHEETS—SHEET 1.
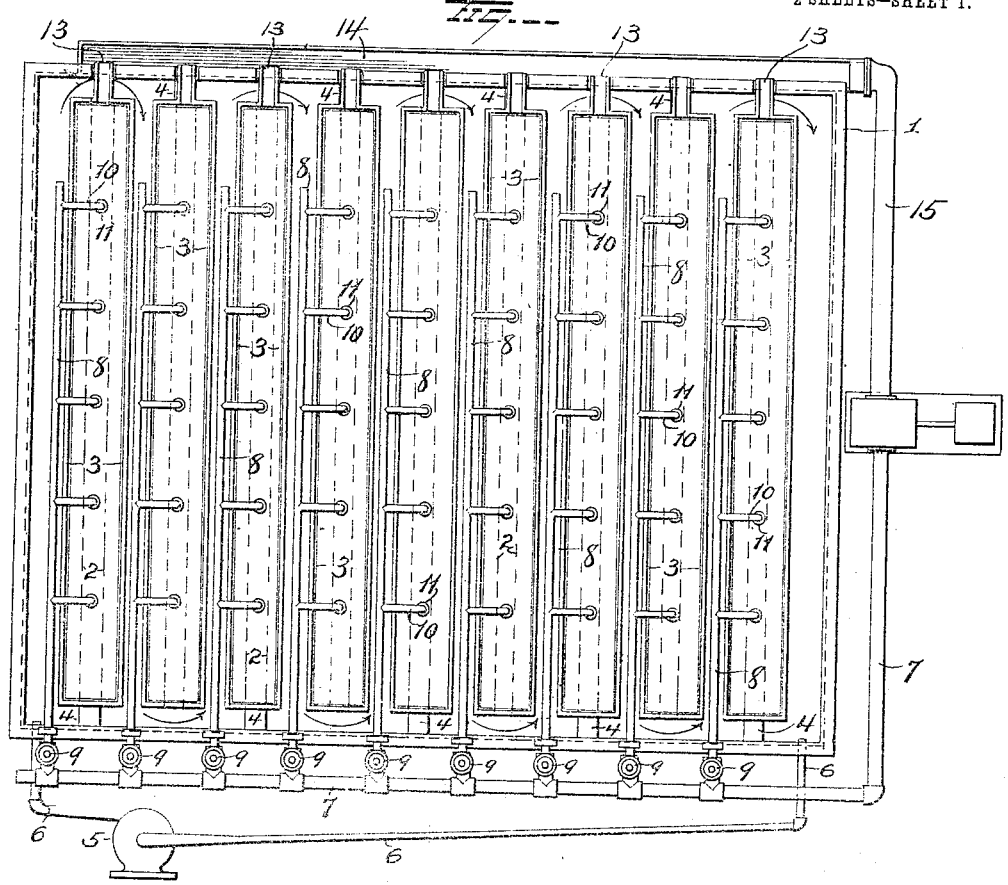
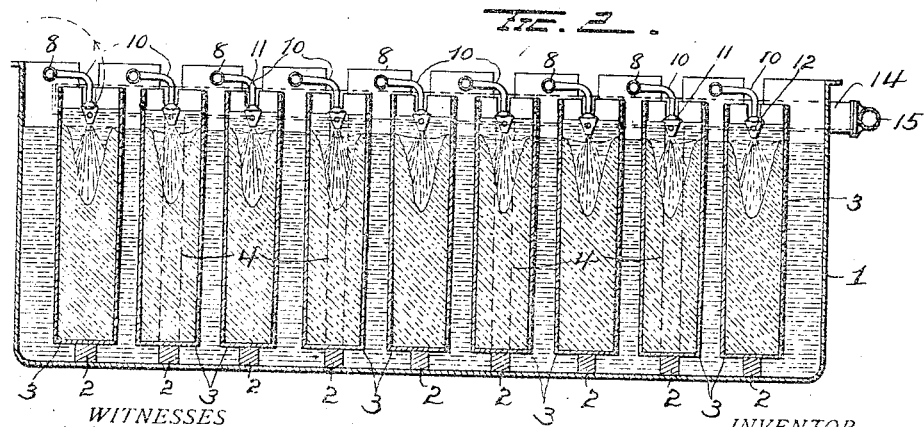
WITNESSES
INVENTOR
F. A. Rider
By H. A. Seymour
Attorney

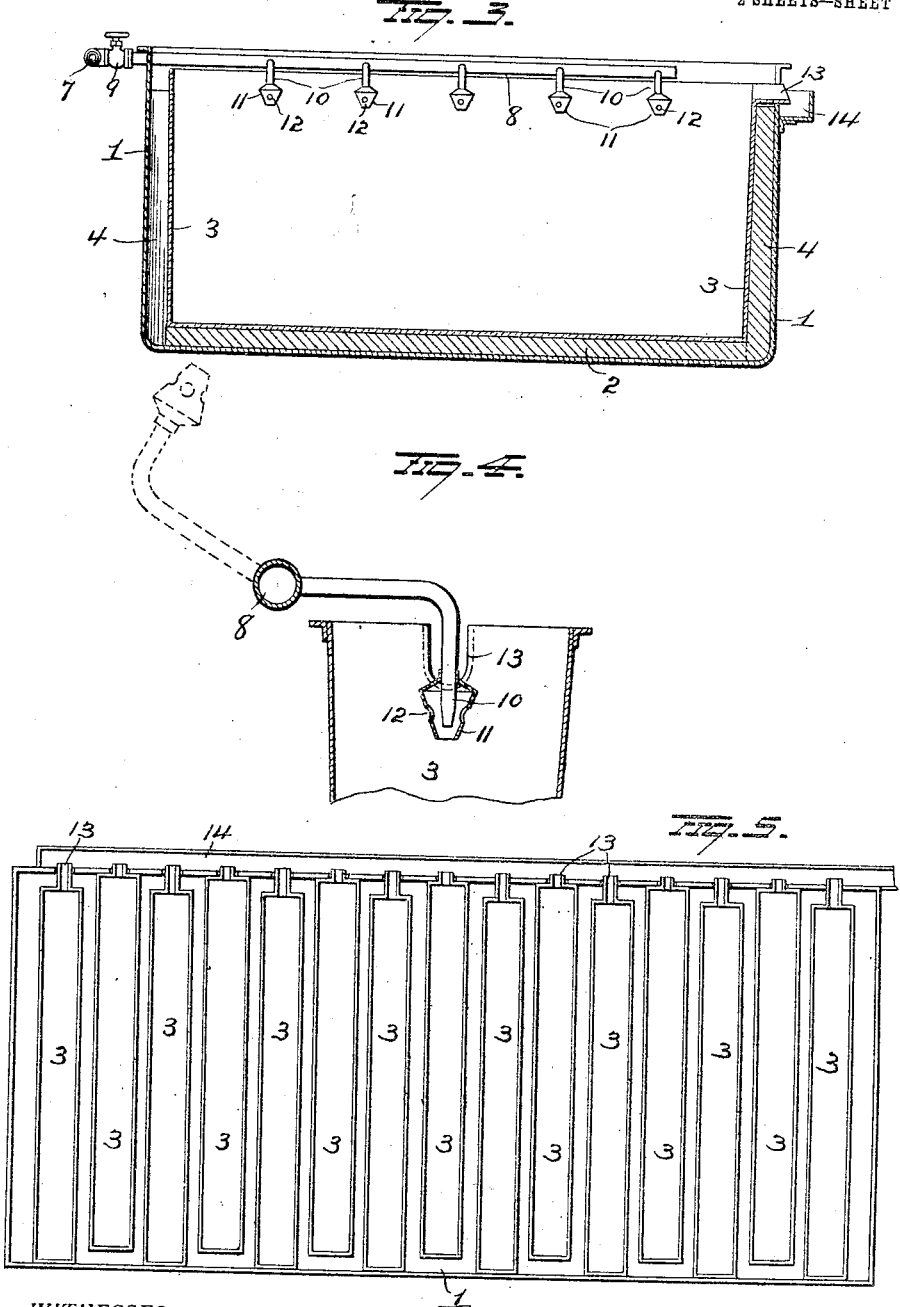

UNITED STATES PATENT OFFICE.

FRANK A. RIDER, OF PITTSBURG, PENNSYLVANIA.

APPARATUS FOR MAKING CLEAR ICE IN CANS.

935,928.  Specification of Letters Patent.  Patented Oct. 5, 1909.

Application filed February 24, 1909. Serial No. 479,698.

*To all whom it may concern:*

Be it known that I, FRANK A. RIDER, of Pittsburg, in the county of Allegheny and State of Pennsylvania, have invented certain new and useful Improvements in Apparatus for Making Clear Ice in Cans; and I do hereby declare the following to be a full, clear, and exact description of the invention, such as will enable others skilled in the art to which it appertains to make and use the same.

This invention relates to improvements in apparatus for making clear ice in cans,—one object of the invention being to so construct the apparatus that proper agitation of the water to be frozen for the purpose of preventing the formation of air bubbles, can be effected with the use of the water itself and without the employment of either mechanical agitating means or air jets.

A further object is to construct the apparatus in such manner that the cans in which the ice is formed can be utilized as baffles to cause circulation of the refrigerant through the tank and around the cans.

A further object is to improve apparatus of the character described in certain other respects as hereinafter set forth.

With these objects in view the invention consists in certain novel features of construction and combinations of parts as hereinafter set forth and pointed out in the claims.

In the accompanying drawings, Figure 1 is a plan view of an ice making apparatus embodying my improvements. Fig. 2 is a longitudinal sectional view. Fig. 3 is a transverse sectional view. Fig. 4 is an enlarged sectional view showing one can and device for agitating the water therein and for supplying the water to be frozen, and Fig. 5 is a view of a slight modification.

1 represents a tank provided in its bottom with a series of transverse ribs 2, on which cans for the reception of freezing water are located and supported slightly above the bottom of the tank. The cans 3 are spaced apart and the tank 1 is provided on each side wall with ribs 4 against which one end of each can abuts. The ribs 4 are so arranged that they will be engaged by one end of alternate cans. A pump 5 adapted to receive brine or other refrigerant from a suitable source of supply, is connected by means of pipes 6 with respective ends of the tank 1 and this pump will serve to cause a circulation of the refrigerant around the cans (the latter serving as baffles) to cause congealing of the water in the cans. The level of the brine in the tanks will be maintained some distance below the tops of the cans so that a body of water will always be contained in the cans which cannot be frozen by the action of the brine.

Instead of providing the side walls of the tank with ribs 4 to cause a circulation of brine around the cans as above explained, these ribs may be omitted and successive cans made to engage alternately the side walls of the tank, as shown in Fig. 5.

A water supply pipe 7 is located in proximity to one side of the tank and is connected with a pump which will operate to force water through said pipe under pressure. A series of pipes 8 communicate with and are hinged to the pipe 7, each of said pipes 8 being provided with a suitable valve 9. The pipes 8 project over the tank intermediate of the freezing cans and each is provided with a series of jet-pipes 10 which project into the cans and terminate some distance below the tops of the latter. A jet-hood 11 is secured to each jet-pipe so that its open end will be disposed below the open end of the jet-pipe. Each jet-hood is provided with a series of perforations 12 which are located above the plane of the discharge end of the jet pipe. With this arrangement, water will be discharged under pressure from the jet-pipes and will leave the latter with sufficient force to cause agitation of the water in the cans for the purpose of preventing the formation of air bubbles in the ice. Such agitation will be augmented with the use of the jet-hood 11 which will receive the water contained in the upper portion of the can through the holes 12 and this water will be discharged through the open lower end of the jet-hood by the action of the water flowing under pressure from the discharge end of the jet-pipe which terminates above the discharge end of the jet-hood.

In order to provide for the discharge of accumulated water in the cans and preventing the overflow of the same into the brine, each can is provided at one end below its top with a spout 13 and the spouts of all the cans discharge into a trough 14 at one side of the tank. The trough 14 communicates with a pipe 15 and the latter may be connected with the water pump so that the fresh overflow water from the cans can be again forced into the latter through the jet devices.

Having fully described my invention what I claim as new and desire to secure by Letters-Patent, is,—

1. In apparatus for making clear ice in cans, the combination with a tank and a series of cans therein, of jet devices for discharging water downwardly into said cans, a pump connected directly with said jet devices for discharging water under pressure through said jet devices, a trough located in proximity to said tank, spouts communicating with the cans and discharging into said trough, and a pipe connecting the trough with the pump.

2. In apparatus for making clear ice in cans, the combination with a tank and a series of cans therein, of a water supply pipe, vertical movable pipes communicating with said supply pipe and adapted to project over the tank, jet-pipes communicating with the vertical movable pipes adapted to discharge downwardly into the cans, spouts for the cans below their tops, and means for receiving overflow water from said spouts.

3. In apparatus for making clear ice in cans, the combination with a tank and a can therein, of means for circulating refrigerant around said can an appreciable distance below the top thereof, a jet-pipe depending into the can, means for forcing water through said jet-pipe, and a jet-hood on the jet-pipe and having its discharge end below the discharge end of the jet-pipe, said jet-hood having holes above the plane of the discharge end of the jet-pipe.

4. In apparatus for making clear ice in cans, the combination with a tank, of a series of cans located therein in zig-zag formation transversely of the tank and constituting baffles for refrigerant, means for forcing said refrigerant through the tank and means for discharging water to be frozen in said cans.

5. In apparatus for making clear ice in cans, the combination with a tank provided on its side walls with inwardly projecting ribs, of a series of cans located within said tank and spaced apart, one end of each alternate can of one series engaging a rib on one side wall of the tank and the opposite ends of the alternate cans of the other series engaging ribs on the opposite wall of the tank, whereby said cans will constitute baffles, means for forcing refrigerant through the tank, means for discharging water into the cans, and means for receiving overflow from the cans.

6. In apparatus for making clear ice in cans, the combination with a tank, of a series of cans located therein in zig-zag formation transversely of the tank and constituting baffles for refrigerant, and means for forcing said refrigerant through the tank.

In testimony whereof, I have signed this specification in the presence of two subscribing witnesses.

FRANK A. RIDER.

Witnesses:
L. H. G. BRACKEMEYER,
A. H. EAMES.